(12) United States Patent
Frey et al.

(10) Patent No.: US 10,498,396 B1
(45) Date of Patent: Dec. 3, 2019

(54) TRANSCEIVER WITH GALVANIC ISOLATION MEANS

(71) Applicant: Melexis Technologies NV, Tessenderlo (BE)

(72) Inventors: Michael Frey, Erfurt (DE); Thomas Freitag, Plaue (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 16/211,501

(22) Filed: Dec. 6, 2018

(30) Foreign Application Priority Data

Jul. 16, 2018 (EP) ..................................... 18183669

(51) Int. Cl.
*H04B 5/00* (2006.01)

(52) U.S. Cl.
CPC ........... *H04B 5/0012* (2013.01); *H04B 5/005* (2013.01)

(58) Field of Classification Search
CPC ..... H04B 5/0012; H04B 5/0031; H04B 5/005
See application file for complete search history.

(56) References Cited

U.S. PATENT DOCUMENTS

| | | | | |
|---|---|---|---|---|
| 8,502,584 B1 * | 8/2013 | Dong | ....................... | H04B 3/50 307/109 |
| 8,693,554 B2 * | 4/2014 | Shrestha | .............. | H04B 5/0012 375/257 |
| 8,867,592 B2 * | 10/2014 | Shrestha | ............. | H04L 25/0268 307/104 |
| 9,473,329 B1 * | 10/2016 | Edwards | ............. | H04L 25/0268 |
| 2002/0135236 A1 | 9/2002 | Haigh et al. | | |
| 2008/0180226 A1 | 7/2008 | Schmidt | | |
| 2009/0206960 A1 | 8/2009 | Ng et al. | | |
| 2010/0020448 A1 | 1/2010 | Ng et al. | | |
| 2013/0279550 A1 | 10/2013 | Boezen et al. | | |
| 2015/0070073 A1 | 3/2015 | Moghe et al. | | |
| 2015/0222241 A1 | 8/2015 | Brudermann et al. | | |

FOREIGN PATENT DOCUMENTS

| | | |
|---|---|---|
| EP | 3324577 A1 | 5/2018 |
| WO | 2012159168 A1 | 11/2012 |
| WO | 2014029585 A1 | 2/2014 |

OTHER PUBLICATIONS

Extended European Search Report from EP Application No. EP 18183669.3, dated Oct. 15, 2018.

* cited by examiner

*Primary Examiner* — Patrick O Neill
(74) *Attorney, Agent, or Firm* — Workman Nydegger (57) ABSTRACT

A data transceiver device for bus communication includes: first and second semiconductor areas; a galvanic isolation means to galvanically isolate the first and second semiconductor areas; an input for receiving a signal to be transferred from the first semiconductor area to the second semiconductor area; a first capacitor in a first signal path and a second capacitor in a second signal path, each capacitor having a first plate connected to the first semiconductor area and a second plate connected to the second semiconductor area and each arranged for transferring a version of the received signal via the first and second signal paths, respectively; storage means having memory states controllable by the versions of the received signal and arranged to derive from the versions of the received signal the memory states. The storage means is arranged to obtain from the memory states an output signal in according to the received signal.

16 Claims, 7 Drawing Sheets

TRANSCEIVER WITH GALVANIC ISOLATION MEANS

FIELD OF THE INVENTION

The present invention is generally related to the field of transceiver devices wherein galvanic isolation is provided between different semiconductor regions.

BACKGROUND OF THE INVENTION

In recent years a two voltage based supply system has been introduced in the automotive world. Power consuming systems as for instance an electric turbo charger or an engine cooling fan can be supplied e.g. by a 48V supply voltage and other systems, as for instance a window lifter, are supplied by the classic 12V supply. One of the reasons for employing different supply voltages relates to the power losses, which scale with a power of 2 according to the Ohmic law: $P=I*I*R$.

If the supply voltage for a given system is increased by a factor of 4 from 12V to 48V, the current of that system scales down with a factor of 4 accordingly. However, the Ohmic losses via the supply wires scale down with a factor of 16, which saves energy and fuel consumption and reduces $CO_2$ and $NO_x$ emissions.

As there are now two voltage domains in the car and there are systems, which are working on the 48V domain and others on the 12V domain, both domains need to allow a transfer of information signals between the systems of the different domains.

On the other hand, the voltage domains should not influence each other. This means a failure in the 48V domain should not influence systems in the 12V domain and vice versa. For that purpose, it is required that both domains on each system level (e.g. the engine cooling fan) be always galvanically isolated from each other. Only on a very few dedicated points in the car, the ground supplies of the 12V and the 48V domain are connected together.

On a given system level (e.g. an engine cooling fan) a common ground connection for both supply domains is not allowed. Both supply domains must strictly be separated from each other.

A Controller Area Network (CAN) or a Local Interconnect Network (LIN) bus (because of their nature and their specification) is always generated and handled in the 12V domain. A specification for these busses for the 48V is not planned, as the nodes would increase in cost.

This implies that, when a system in the 48V domain is controlled by a CAN bus, this system needs to have a galvanic isolation means to enable a signal exchange between the CAN bus of a 12V domain and the system as for instance engine cooling fan in the 48V domain. The galvanic isolation means must enable a signal transfer with a requested communication speed of, for instance, the CAN bus. On the other hand, information generated in the 48V domain, may need to be passed to the network in the 12V domain. This implies that the signal exchange over the galvanic isolation means must be bidirectional.

Figure 1:
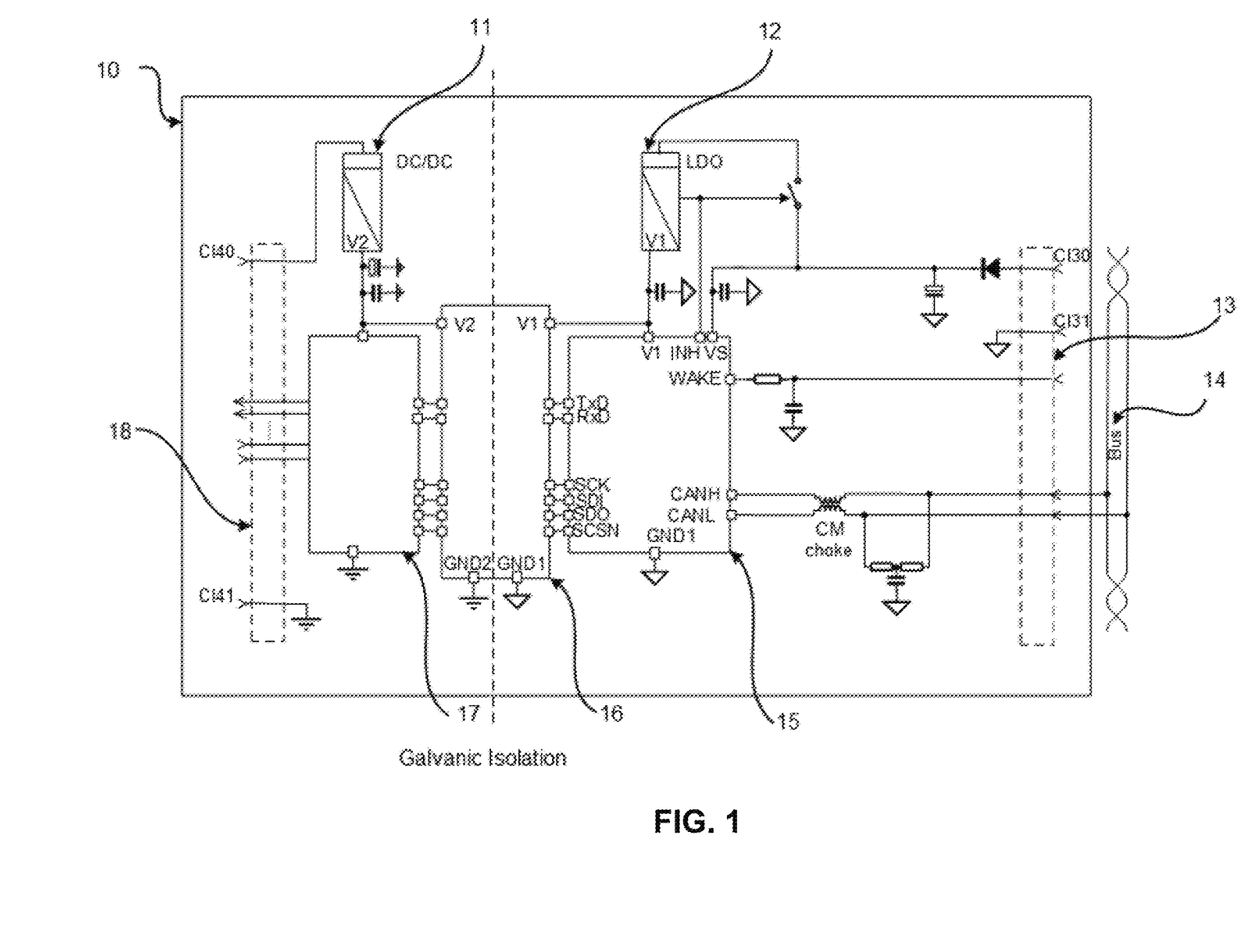
FIG. 1 illustrates a system comprising a conventional transceiver device.

A prior art solution is illustrated in FIG. 1. A high level controlling unit 10 is shown comprising a communication bus 14, which is in this example a CAN bus. The CAN bus with its pins CANL, CANH is connected to a conventional transceiver device 15. The transceiver device 15 receives a supply voltage +12V as a signal VS via a C130 pin on a first connector 13 and a reverse polarity diode. Pin C131 of that first connector is the GND1 ground supply related to the +12V supply. The transceiver device further receives a supply voltage V1 of e.g. 5V via a voltage converter 12, e.g. a low drop voltage regulator. The transceiver device 15 is connected to a ground supply GND1 via the pin C131. The positive supply V1 and the ground supply GND1 are given also to an optocoupler 16.

The transceiver device transforms the signals CANL, CANH into the communication signals RxD and TxD. The transceiver device might have also other control signals e.g. a serial clock (SCK), slave device input (SDI), slave device output (SDO) and control signals (e.g. SCSN) in order to allow the transceiver device e.g. to be configured. The signals are given to the optocoupler 16, which transfers these signals in a galvanically isolated manner to the 48V domain. The transferred signals are fed to a microcontroller 17, which processes the signals further for a controlling means of the e.g. engine cooling fan. It should be noted that the microcontroller 17 can also send signals towards the optocoupler 16, so that the transceiver device 15 receives these signals. In other words, the signal transfer from the transceiver device to the optocoupler to the microcontroller is mostly bidirectional.

In the 48V domain a +48V supply is provided as C140 via a second connector 18 to a voltage converter 11, which can be for instance a DC/DC converter providing e.g. a voltage V2 of +5V to a microcontroller 17. V2 is also provided to the optocoupler 16. Microcontroller and optocoupler are supplied with a ground supply GND2, which is provided via pin CI41.

It can be noted that the optocoupler 16 has two separate supply pins (V1, V2) and two separate ground pins (GND1, GND2). Using an optocoupler, a galvanic isolation between the two supply domains is possible. The optocoupler may be replaced by e.g. an inductive based signal transformer, which also realizes a galvanic isolation. Other alternatives are available.

However, the CAN bus is a high-speed bus with data rates up to 2 MBit/s. Especially in the automotive environment optocouplers might be too slow. As an optocoupler is an additional device, also additional cost and space issues are involved.

WO2012/159168 discloses an USB driver, galvanically isolated with the signal transfer in a full differential approach. The hardware efforts and thus costs might be high. Due to noise there may be robustness issues in the automotive harness.

WO2014/029585 and US2009/206960 show a full differential approach wherein four capacitors are used for a galvanic isolation of one signal. Consequently, the required hardware effort and thus cost are relatively high.

In US2013/279550 a method of communicating data values over a three-conductor interface is presented. Different data values are transmitted by generating and transmitting three respective signals to a receiver using three respective conductors. The first signal is maintained as a set voltage level. The second signal is alternated between a high voltage and a low voltage according to a carrier frequency. The third signal is alternated between the high and low voltages and is out of phase with the second signal. Signal disturbances related noise, especially in automotive harness, however has a negative effect. Additionally, the hardware efforts and thus costs are high.

A solution of a somewhat different scope is found in US2008/180226, where two CAN networks are separated with a galvanic isolation barrier.

Hence, there is room for improvement. In particular, there is a need for a solution wherein the optocoupler is removed and the galvanic isolation means and the signal transfer over it are realized in a different way.

SUMMARY OF THE INVENTION

It is an object of embodiments of the present invention to provide for a transceiver device wherein the galvanic isolation between semiconductor areas in the device is realized in a different way than with an optocoupler.

The above objective is accomplished by the solution according to the present invention.

In a first aspect the invention relates to a data transceiver device for bus communication, comprising a first and a second semiconductor area, a galvanic isolation means to galvanically isolate said first and a second semiconductor area, an input for receiving a signal to be transferred from said first semiconductor area to said second semiconductor area, a first capacitor in a first signal path and a second capacitor in a second signal path, each capacitor having a first plate connected to said first semiconductor area and a second plate connected to said second semiconductor area and each arranged for transferring a version of said received signal via said first signal path and via said second signal path, respectively, storage means having memory states controllable by said versions of said received signal and arranged to derive from said versions of said received signal said memory states, said storage means arranged to obtain from said memory states an output signal in accordance with said received signal.

The proposed solution indeed allows for galvanically isolating the first and second semiconductor area. Via the capacitors a received signal can be transferred from one semiconductor area to the other semiconductor area. The proposed solution offers various advantages, e.g. it requires a relatively small silicon area, so that the implementation is cost efficient.

In a preferred embodiment the first and the second semiconductor area are silicon areas and the galvanic isolation means is a $SiO_2$ trench isolation means.

Preferably the received signal is a digital signal. One capacitor of said first and said second capacitor is then advantageously arranged for transferring to the storage means a version of the received signal corresponding to a signal transition from a voltage level corresponding to a logic 0 to a voltage level corresponding to a logic 1 and the other capacitor is arranged for transferring to the storage means a version of the received signal corresponding to a signal transition from the voltage level corresponding to the logic 1 to the voltage level corresponding to the logic 0.

In a preferred embodiment one of the semiconductor areas has a voltage level shifting stage comprising for each of the signal paths a voltage level shifting circuit. The voltage level shifting stage preferably comprises at least one adjustable current source.

In one embodiment at least one of the first and the second capacitor is adjustable.

Advantageously, the first and the second capacitor have a charging time or a discharging time smaller than the bit time of the received signal.

In another embodiment the first and the second semiconductor area have distinct positive supply voltage pins. The first and the second semiconductor area preferably also have distinct negative supply voltage pins.

In one embodiment the data transceiver device is arranged for bidirectional bus communication.

In a preferred embodiment the storage means is an RS flip flop.

In another embodiment the received signal is a permanent toggling signal and the transceiver device comprises a monitoring unit to monitor the permanent toggling signal and to generate an error signal.

The data transceiver device is in an advantageous embodiment implemented as a LIN transceiver or a CAN transceiver.

The invention also relates to a system comprising a data transceiver device as previously described.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a data transceiver device wherein the use of an optocoupler and the above-mentioned drawbacks of prior art solutions are avoided. In a transceiver device according to the invention a galvanic isolation is achieved in a different way.

In the transceiver device there are signals running between a first voltage domain (e.g. 12V) and a second voltage domain (e.g. 48V). The signals to be transferred are in preferred embodiments of a digital nature and carry a high voltage level (corresponding e.g. to a logic 1) or a low voltage level (corresponding e.g. to a logic 0). A logic signal in the first domain has for instance a high voltage level of V1 and a low voltage level of GND1. A logic signal in the second domain has for instance a high voltage level of V2 and a low voltage level of GND2.

Preferably a logic 1 signal in the first voltage domain is also a logic 1 signal in the second domain and similarly, a logic 0 signal in the first domain is a logic 0 level in the second voltage domain. However, inversions of the signals between a first voltage domain and a second voltage domain are also possible.

Figure 2:
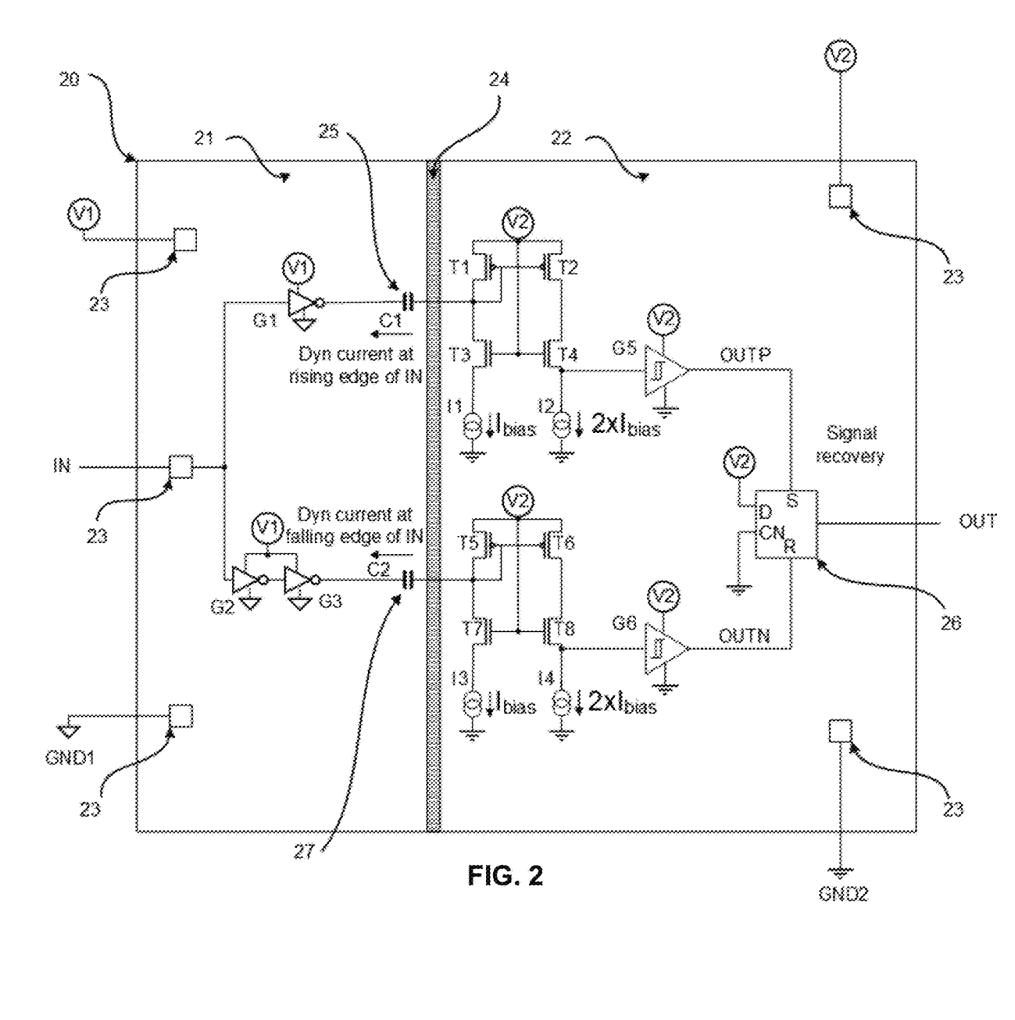
FIG. 2 illustrates an embodiment of a transceiver device according to the invention.

FIG. 2 illustrates an embodiment of a transceiver device 20 with galvanic isolation means according to the invention. An input signal is received in a first domain with supply voltage V1 and a ground voltage GND1 and is to be transferred to a second voltage domain with supply voltage V2 and a ground voltage GND2.

In a preferred embodiment the transceiver device is realized as an integrated circuit (IC). The integrated circuit can be realized in e.g. a silicon-on-insulator technology, which allows having separate semiconductor areas 21, 22, as for instance Si areas separated from each other by a galvanic isolation barrier 24, e.g. a SiO$_2$ layer. As SiO$_2$ is an isolator, there is no current flow possible between the different semiconductor areas. The galvanic isolation barrier can be e.g. trench isolation.

In certain embodiments there can also be more than two separate semiconductor areas. Consequently, in such cases more than one galvanic isolation barrier may be present, as all the semiconductor areas need to be separated from one another.

Each semiconductor area typically has its own electronic components. Each semiconductor area 21, 22 may have own bonding pads 23. As illustrated in FIG. 2, via bonding pads 23 a positive supply V1 and a ground supply GND1 are connected to e.g. a semiconductor area 21. Further, via other bonding pads 23 a positive supply V2 and a ground supply GND2 are connected to e.g. a semiconductor area 22. A digital input signal IN running from the first to the second domain is provided via a bonding pad 23 to e.g. semiconductor area 21.

In the embodiment illustrated in FIG. 2 the semiconductor area 21 comprises inverter elements G1, G2, G3. In semiconductor area 22 one finds transistors T1, T2, T3, T3, T5, T6, T7, T8, current sources I1, I2, I3, I4, Schmitt triggers G5 and G6 and a storage element 26. The various components are supplied with the supply voltage and ground voltage of the semiconductor area to which they belong.

The capacitors C1 and C2 can be located in the semiconductor area 21 or 22 or partially in area 21 and partially in area 22. The capacitors C1 (25) and C2 (27) can in a preferred embodiment be metal capacitors realized in the semiconductor technology. This means a metal area is forming one electrode and another metal area is forming a second electrode, while an isolation material as for instance SiO$_2$ or SiN is forming a dielectric between the metal areas. As a capacitor always removes all DC elements, only AC elements of a given signal are transferred.

The separation of the semiconductor areas is in a preferred embodiment done in the substrate, whereof a semiconductor area is formed by a semiconductor (for instance Si or any other semiconductor material) and whereof the isolation means is formed by an isolator as for instance SiO$_2$. This implies that electronic elements, which are not part of a substrate and are formed by layers above that substrate, can be located anywhere. A metal capacitor can have its metal plates and the dielectric in between in semiconductor area 21 or 22 or in both areas.

Figure 3:
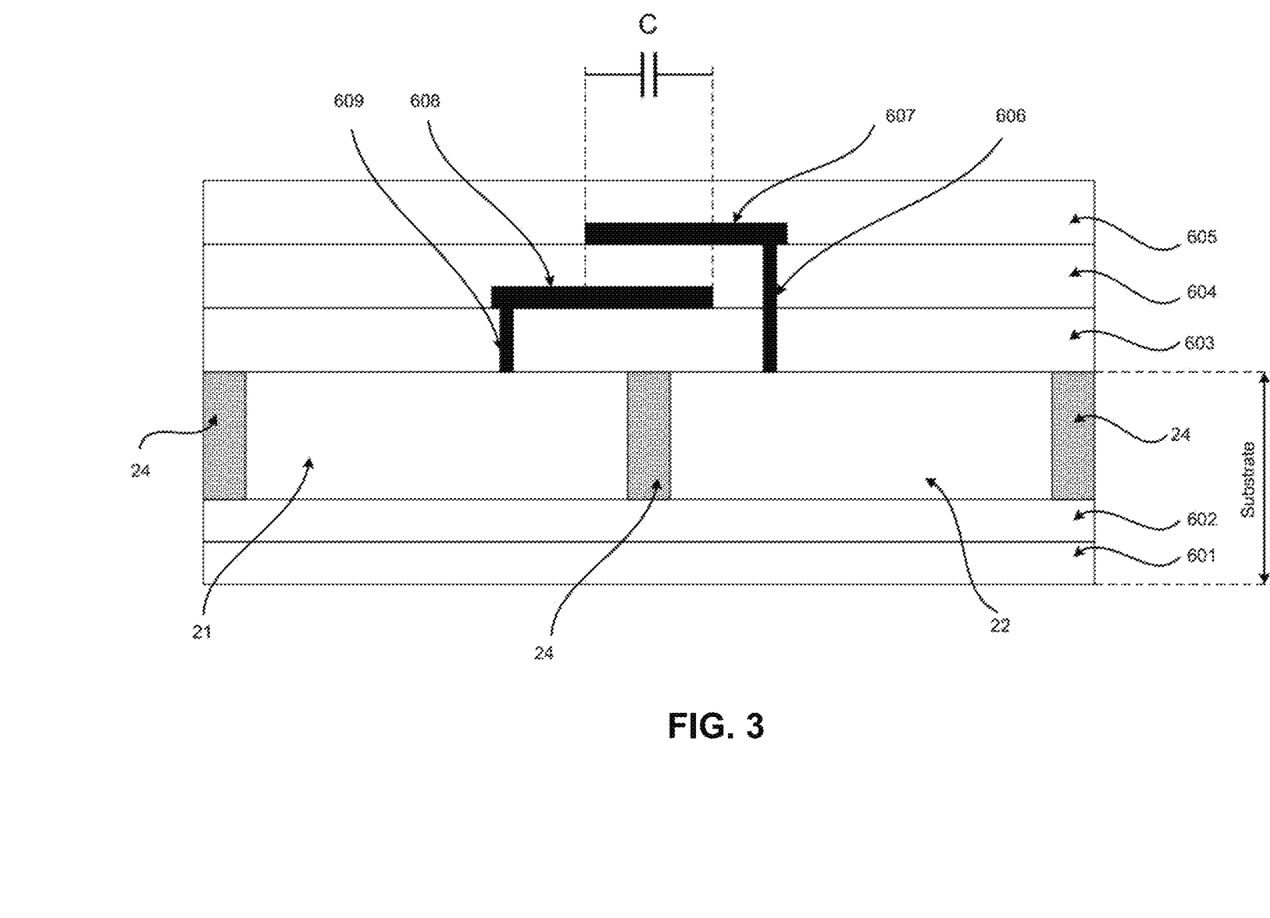
FIG. 3 illustrates a realisation of a capacitor on top of the substrate.

FIG. 3 provides an illustration. The semiconductor areas 21 and 22 are indicated separated by a galvanic isolation barrier 24. Deeper in the substrate there is an isolation layer 602 (e.g. SiO$_2$) and a handle wafer 601 (e.g. Si). On top of the substrate isolating layers 603, 604 and 605 are provided (e.g. SiO$_2$). Metal layers 607, 608 provide via a metal contact 606, 609 a connection to semiconductor area 22 and semiconductor area 21, respectively. As can be seen in FIG. 3, the intersection of metal layers 607 and 608 forms a capacitor. Isolation layer 604 serves as dielectric between the capacitor plates. Depending on the arrangement the intersection can be in semiconductor area 21 or in area 22 or partially in area 21 and in area 22 (as is the case in FIG. 3). It is to be noted that the capacitor can be connected to its semiconductor area either directly or indirectly. An indirect connection can for example be established via one or more resistors or other electric components connected to one plate of the capacitor, while the one or more resistors or other electronic components is at the other side connected to the respective semiconductor area.

The digital input signal IN is applied to an inverting stage G1 in a first signal path and a non-inverting stage G2 and G3 in a second signal path. The output signal of G1 is fed to a capacitor C1 and the output signal of G3 to a capacitor C2.

The output signal of the capacitor C1 is provided to a level shifting stage formed by the transistors T1, T2, T3, T4 and two current sources I1 and I2. In the path of T1 and T3 a current Ibias is flowing and in the path of T2, T4 a current of two times Ibias is flowing. In case the input signal is a logic 0 and does not change, the capacitor C1 carries on the left terminal in FIG. 2 a potential V1 and on the right terminal a potential of V2-Vth(T1), whereby Vth(T1) denotes the threshold voltage of T1. T3 and T4 are conducting, allowing said currents Ibias and 2*Ibias to flow. T4 therefore provides a voltage of nearly GND2 to the Schmitt trigger G5, so that a GND2 voltage is provided to a storing element 26. In a preferred embodiment the storing element 26 is an RS Flip flop. The output of that storing element OUT does not change its state as the GND2 voltage level (logic 0 information) is not an active signal information for triggering that storing element.

The output of the capacitor C2 is provided to a level shifting stage formed by the transistors T5, T6, T7, T8 and two current sources I3 and I4. In the path of T5 and T7 a current Ibias is flowing and in the path of T6, T8 a current of twice Ibias is flowing. In case the input signal is a logic 0 and does not change, the capacitor C2 carries on the left terminal a potential GND1 and on the right terminal a potential of V2-Vth(T5). T7 and T8 are conducting, allowing said currents to flow. T8 therefore provides a voltage of nearly GND2 to the Schmitt trigger G6, so that a GND2 voltage is provided to a storage element 26, which is in a preferred embodiment an RS Flip flop. The storage element output signal OUT does not change its state as the GND2 voltage level (logic 0 information) is not an active signal information for triggering that storage element.

When there is a signal change in input signal IN from a logic 0 to a logic 1 in the first domain (voltage V1), the following situation is encountered. The left terminal of C1 changes from V1 to GND1. This introduces a capacitive current flow in C1. This capacitive current flow is additional to the current Ibias of the current source I1 in the path comprising T1 and T3. The sum of Ibias and the capacitive current flows in T1 and is mirrored via T2 in the path containing T2 and T4. It overdrives the flowing current 2*Ibias of the current source I2 in the path with transistors T2 and T4 so that the G5 gets at its input a high potential which allows triggering G5, so that the output OUTP of G5 is switched to a high potential as well. The storing element 26 receives this high potential on OUTP via its input S as an active signal information. Element 26 triggers to store that logic 1 information on the output OUT in the second domain after a signal delay time dt1 (see FIG. 4). The capacitor C1 is charged via T1 again to V2-Vth((T1), thus the capacitive current flow reduces to nearly zero, so that after a time dt2 transistor T4 is providing again a GND2 potential to the input of G5. Hence, G5 switches and its output OUTP falls back to GND2 potential, which is a non-active signal information for triggering the storing element 26. The storing element 26 therefore keeps the logic 1 information on its output OUT.

In the bottom branch containing C2 the following happens when signal IN changes from a logic 0 to a logic 1. The left terminal of C2 (see FIG. 2) changes from GND1 to V1. This introduces a capacitive current flow in C2 that is injected into T5 and in opposite direction of Ibias. Because of that, only the differential current is mirrored to the path comprising T6 and T8, which is much lower than 2*Ibias in the path of T6 and T8. G6 therefore still gets a low potential so that it is not triggered. The output of G6 OUTN stays therefore at GND2 potential (corresponding to a logic 0 information), which is a non-active signal for triggering the storing element 26. Ibias discharges the capacitor C2. The storing element 26 therefore keeps the logic 1 information on its output OUT. This means the logic 1 information of the V1 voltage domain has been transferred to a logic 1 information of the V2 voltage domain.

Figure 4:
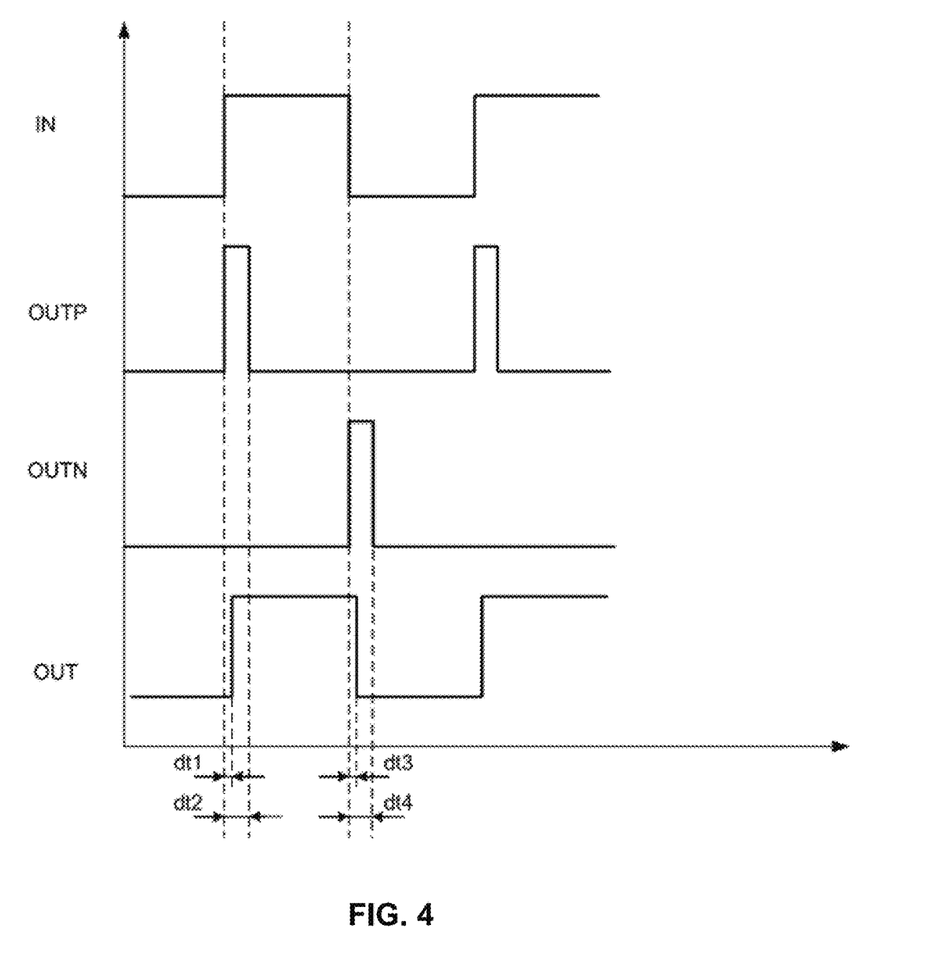
FIG. 4 illustrates the behaviour of some signals in the transceiver device of FIG. 2.

It should be noted that the charging or discharging times for the capacitors, e.g. dt2, dt4 in FIG. 4, are much shorter than the signal bit time, which is 0.5 μs for a CAN bus operating at 2 MBit/s. The charging or discharging times for the capacitors can be for instance in the range of 50-300 ns for e.g. a CAN bus application.

Now a signal change of signal IN from logic 1 to logic 0 in the V1 domain is described. The left terminal of C1 changes from GND to V1. This introduces a capacitive current flow in C1 that is injected into T1 and in opposite direction of Ibias. Because of that only the differential current is mirrored to the path containing T2 and T4, which is much lower than 2*Ibias in the path of T2 and T4. G5 therefore still gets a low potential, so that it is not triggered. The output of G5 OUTP stays therefore at GND2 potential (corresponding to a logic 0 information), which is a non-active signal for triggering the storage element 26. Ibias discharges the capacitor C1 similarly as previously described.

The left terminal of C2 change from V1 to GND1. This introduces a capacitive current flow in C2. This capacitive current flow is additional to the current Ibias of the current source I3 in the path T5, T7. The sum of Ibias and the capacitive current flow in T5 is mirrored via T6 in the path comprising T6 and T8. It overdrives the flowing current 2*Ibias in the path with T6 and T8. The input of G6 therefore gets a high potential which allows triggering G6, so that the output of G6 OUTN is switched to a high potential as well. The storing element 26 receives this high potential on OUTN as an active signal information and triggers. As the signal is supplied via an alternative input (R), the storing element 26 now stores a logic 0 and supplies that to the output OUT of the storing element 26 in the other voltage domain after a signal delay time dt3.

The capacitor C2 is charged via T5 again to V2-Vth((T5), thus the capacitive current flow reduces to nearly zero, similarly as already previously described, so that after a time dt4 transistor T8 is providing again a GND2 potential to the input of G6. G6 switches and its output OUTN falls back to GND2 potential, which is a non-active signal information for triggering the storing element 26. The storing element 26 therefore keeps the logic 0 information on its output OUT. This means, the logic 0 information of voltage domain V1 has been transferred to a logic 0 information of voltage domain V2.

Figure 5:
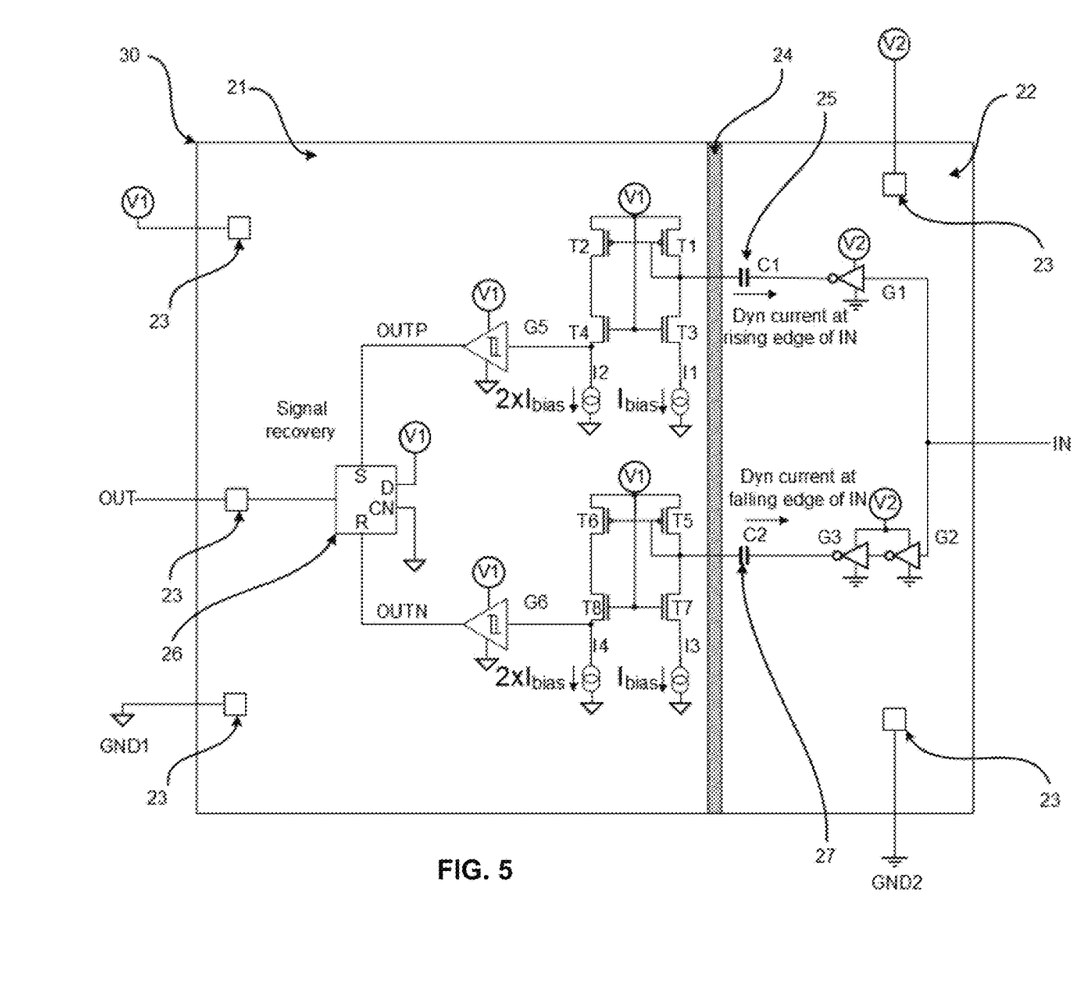
FIG. 5 illustrates another embodiment of a transceiver device according to the invention.

FIG. 5 illustrates basically the same scheme as in FIG. 2. In the embodiment of the transceiver device 30 shown in FIG. 5 the output signal is in the V1 voltage domain. In other words, the signal transfer in FIG. 5 is in the opposite direction of that in FIG. 2. The components and functions are the same as previously described. However, as the voltage domains are now exchanged, the previously described components are now in the other semiconductor area compared to FIG. 2. Again, the various components are supplied with the supply and ground voltages of the semiconductor area to which they belong. This implies that the elements in FIG. 5 are supplied with different supply and ground voltages compared to FIG. 2.

The person skilled in the art will readily recognize that implementing the schemes of FIG. 2 and FIG. 5 can be realized in many ways. The signal chain can be fully or partially inverted. Transistors may be exchanged from p-channel type to n-channel type. The current sources I1, I2, I3, I4 can be arranged to be driven from a positive voltage potential instead of a ground voltage potential, etc. The storing element 26 can be arranged to take a well-defined memory state after power on of the transceiver device. After power on the storing element 26 may provide in certain embodiments e.g. a logic 0 information on its output OUT. The storing element 26 may change its state then depending on the signal being transferred from one voltage domain to the other.

C1 transmits the rising edges of the incoming signal IN to the storing element 26 and allows the storing element to trigger, while C2 transmits the falling edges of the incoming signal to the storing element 26 for allowing it to trigger. Within a time smaller than one bit-time, the capacitors are brought back to the initial charging condition in order to enable the next signal transfer.

Compared to prior art implementations wherein a complete differential signal approach with e.g. also differential amplifiers is adopted, the solutions according to the present invention offer the advantage of being rather small in silicon area and therefore cost optimal. Indeed, only one storing element 26, two capacitors, two level shifters including two current sources as main elements are used for each signal to be transferred between the voltage domains.

Figure 6:
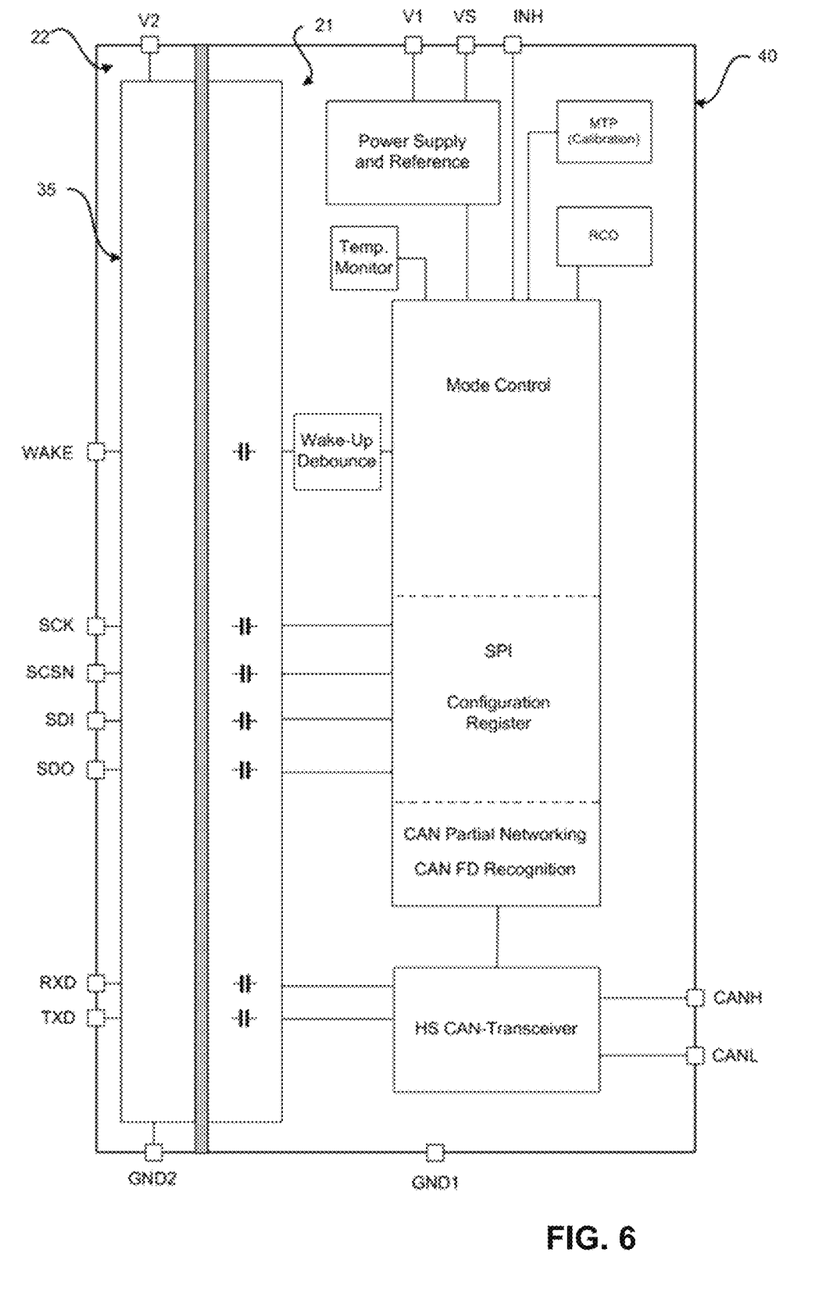
FIG. 6 illustrates an embodiment of a transceiver system comprising a transceiver device as in the present invention.

FIG. 6 illustrates an embodiment of a transceiver system 40 comprising a transceiver device 35 with galvanic isolation means as in the present invention. The transceiver system may in other embodiments comprise one or more further transceiver devices (20,30,35) as previously described depending on how many signals must be transferred from the first to the second voltage domain and vice versa and depending on whether signals are unidirectional or bidirectional.

As illustrated in FIG. 6, the different semiconductor areas 21, 22 can also comprise other functional blocks, which are not directly related with the signal transfer between different voltage domains. In FIG. 6 there is for instance a Multi Time Programmable memory device (MTP) to be used for calibration, a power supply and reference unit, RC oscillator (RCO), a temperature monitor, a wake-up and debounce unit, CAN transceiver, CAN-Flexible-Data-Rate-Recognition-Unit, CAN-Partial-Networking-Unit, SPI unit including configuration registers and for instance a Mode-Control-Unit switching between the different modes of the transceiver device (35) with galvanic isolation means.

In one embodiment the transceiver device with galvanic isolation means can be arranged to support the communication speed of the signals to be transferred by having the capacitors C1, C2 and/or the currents I1, I2, I3, I4 adjustable. The setting of the capacitor values and/or the current values can be done during a manufacturing step, an end of line programming step or during a chip initialization by means of e.g. a non-volatile memory (e.g. the Multi Time Programmable Memory Device (MTP)), wherein this configuration setting can be stored.

In another embodiment permanent toggling signals, as for instance oscillator signals, are transferred between the different voltage domains. These oscillator signals may be monitored by monitoring units arranged in each domain. The monitoring units can observe the transferred signal as it appears at the output, using a time base. In case the permanent toggling signal is not arriving at the assigned monitoring unit in the intended voltage domain in a dedicated time T, a malfunction is present and an error signal may be generated by the monitoring unit. This time T is for instance 2 or 5 or 10 or 100 times the period of the permanent toggling signal. This type of error usually occurs if one or more supply or ground voltages are missing because of e.g. a broken bond wire or a lost PCB connection to the integrated circuit (IC).

Figure 7:
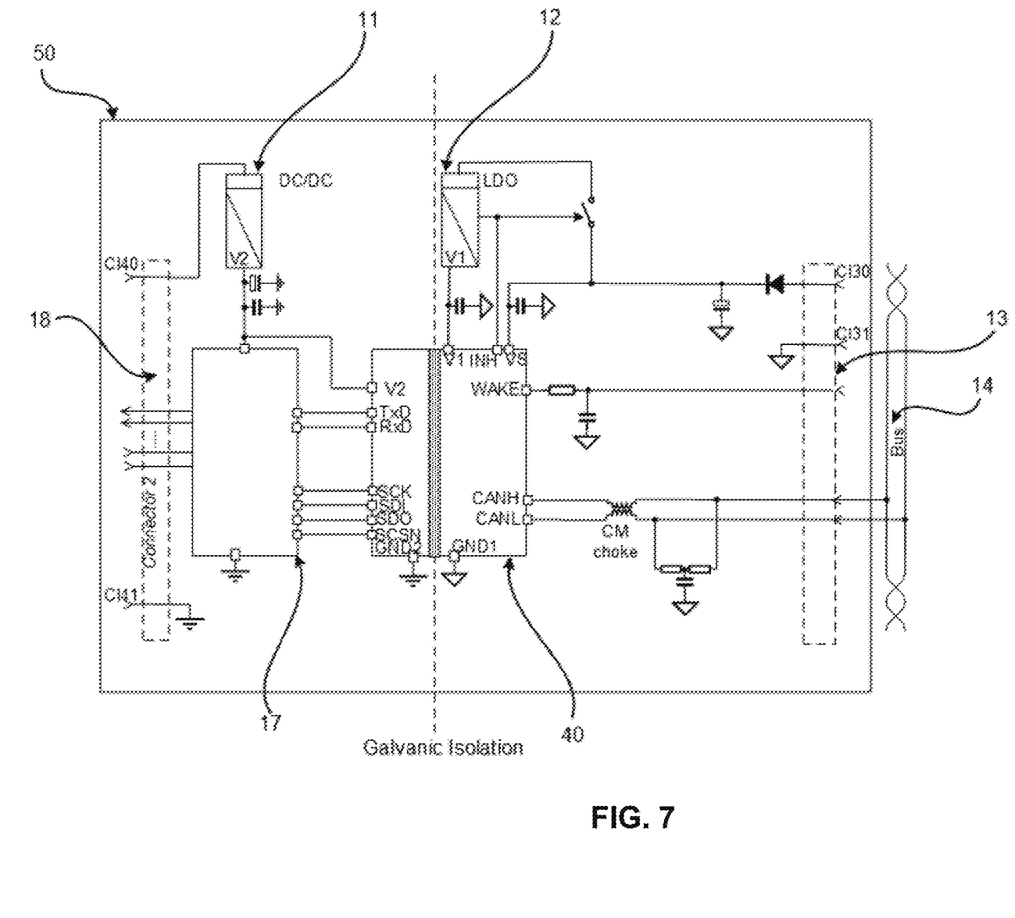
FIG. 7 illustrates another embodiment of a transceiver system comprising a transceiver device as in the present invention.

FIG. 7 represents a high level controlling unit 50 comprising a transceiver system 40 with galvanic isolation means according to the invention. The system shown in FIG. 6 is equivalent in its function to the prior art solution of FIG. 1 except that the optocoupler 16 and the related disadvantages (e.g. communication speed and cost) have been removed. For the rest FIG. 7 shows the same functional blocks as in FIG. 1.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A data transceiver device for bus communication, comprising
a first and a second semiconductor area,
a galvanic isolation means to galvanically isolate said first and said second semiconductor area, an input for receiving a signal to be transferred from said first semiconductor area to said second semiconductor area, a first capacitor in a first signal path and a second capacitor in a second signal path, each capacitor having a first plate connected to said first semiconductor area and a second plate connected to said second semiconductor area and each arranged for transferring a version of said received signal via said first signal path and via said second signal path, respectively, storage means having memory states controllable by said versions of said received signal and arranged to derive from said versions of said received signal said memory states, said storage means arranged to obtain from said memory states an output signal in accordance with said received signal.

2. The data transceiver device as in claim 1, wherein said first and said second semiconductor area are silicon areas and wherein said galvanic isolation means is a $SiO_2$ trench isolation means.

3. The data transceiver device as in claim 1, wherein said received signal is a digital signal.

4. The data transceiver device as in claim 3, wherein one capacitor of said first and said second capacitor is arranged for transferring to said storage means a version of said received signal corresponding to a signal transition from a voltage level corresponding to a logic 0 to a voltage level corresponding to a logic 1 and the other capacitor is arranged for transferring to said storage means a version of said received signal corresponding to a signal transition from said voltage level corresponding to said logic 1 to said voltage level corresponding to said logic 0.

5. The data transceiver device as in claim 1, wherein one of said semiconductor areas has a voltage level shifting stage comprising in each of said signal paths a voltage level shifting circuit.

6. The data transceiver device as in claim 5, wherein said voltage level shifting stage comprises at least one adjustable current source.

7. The data transceiver device as in claim 1, wherein at least one of said first and said second capacitor is adjustable.

8. The data transceiver device as in claim 1, wherein said first and said second capacitor have a charging time or a discharging time smaller than the bit time of said received signal.

9. The data transceiver device as in claim 1, wherein said first and said second semiconductor area have distinct positive supply voltage pins.

10. The data transceiver device as in claim 9, wherein said first and said second semiconductor area also have distinct negative supply voltage pins.

11. The data transceiver device as in claim 1, arranged for bidirectional bus communication.

12. The data transceiver device as in claim 1, wherein said storage means is an RS flip flop.

13. The data transceiver device as in claim 1, wherein said received signal is a permanent toggling signal and wherein said data transceiver device comprises a monitoring unit to monitor said permanent toggling signal and to generate an error signal.

14. The data transceiver device as in claim 1, being implemented as a LIN transceiver or a CAN transceiver.

15. The data transceiver device as in claim 1, being implemented as an integrated circuit.

16. A system comprising a data transceiver device as in claim 1.

* * * * *